United States Patent [19]

Block

[11] 3,855,714
[45] Dec. 24, 1974

[54] INSTRUCTIONAL DEVICE AND METHOD FOR STUDYING THE GROSS ANATOMY OF THE HUMAN OR ANIMAL ORGAN SYSTEMS

[76] Inventor: Bartley C. Block, 233 Plains Rd., Milford, Conn. 06460

[22] Filed: Mar. 5, 1973

[21] Appl. No.: 338,084

[52] U.S. Cl. .................. 35/17, 35/51, 40/125 A, 273/157 A
[51] Int. Cl. .................................. G09b 23/34
[58] Field of Search .......... 35/17, 18 A, 28, 51, 53, 35/54; 46/157; 40/125 A, 142 R

[56] References Cited
UNITED STATES PATENTS

| | | | |
|---|---|---|---|
| 340,270 | 4/1886 | Yaggy | 35/17 |
| 388,593 | 8/1888 | Smith | 35/17 |
| 2,314,790 | 3/1943 | Jenter | 35/54 |
| 2,331,776 | 10/1943 | Heggedal | 46/157 |
| 2,882,619 | 4/1959 | Gloeckner | 35/51 |
| 3,521,380 | 7/1970 | Ruchlis | 35/18 A |

OTHER PUBLICATIONS
1964, Encyclopedia Americana "Anatomy Drawings," Section, Front and Plates I, II, III, IV.

*Primary Examiner*—Harland S. Skogquist
*Attorney, Agent, or Firm*—Alfred E. Miller

[57] ABSTRACT

The present invention relates to an instructional device and method for use in high schools, colleges, universities, nursing schools, and medical schools for group or self-instruction in the gross anatomy of the organ systems and organs of the human body in which the student, following appropriate written instructions and diagrams, makes a two-dimensional plastic reconstruction of one or more organ systems in situ using precisely scaled, appropriately colored components of the organ systems printed on individual segments of transparent vinyl plastic which are applied in their respective positions to either the anterior or posterior surface of a fully articulated, two-dimensional skeletal manikin, the surfaces of which are printed back to back on a glossy and transparent backing surrounded by an outline of the skin.

2 Claims, 6 Drawing Figures

1. Pectoralis minor
2. Coracobrachialis
3. Pectoralis major
4. Deltoid
   *(anterior aspect)*

5. Teres minor
6. Infraspinatus
7. Trapezius
8. Deltoid
   *(posterior aspect)*

INSTRUCTIONAL DEVICE AND METHOD FOR STUDYING THE GROSS ANATOMY OF THE HUMAN OR ANIMAL ORGAN SYSTEMS

It will become apparent hereinafter that the principles upon which the above instructional device and method are based, that is, the use of a glossy two-dimensional model on which transparent vinyl plastic components are properly placed by following appropriate instructions, are also applied to the study of (a) the gross anatomy of other animals and plants using two-dimensional skeletal or body outline manikins; (b) the fine or microscopic structure of cells using two-dimensional cell outline manikins; (c) the architecture of of atoms and molecules using two-dimensional outlines of atoms based on Bohr-Sommerfeld and quantum-mechanical atomic theories; and (d) the physical and chemical interactions between atoms and/or molecules using two-dimensional atomic models to show the electronic interactions which take place in the outermost energy levels.

It is therefore an object of the present invention to provide an instructional device and method for studying organ systems such as the integumentary, muscular, digestive, respiratory, circulatory, urinary, reproductive, nervous, and endocrine systems of the human body and their anatomical relationships to the skeleton from both anterior and posterior aspects.

Another object of the present invention is to provide transparent vinyl plastic components forming the composition of each major organ of the organ systems which may be pressure-applied to their proper locations on a two-dimensional manikin of the human skeleton.

A further object of the present invention is to provide an instructional device and method for studying human organ systems in which various colors are used to depict important features of each major organ of the organ system or systems under study. When, for example, all the muscles are applied to the anterior and posterior aspects of the skeleton, the student can determine, through bands of red color, for example, which indicate the fiber direction of each muscle, the physical contributions made by muscles on the posterior aspect of the body to the shape and contours of the anterior surface. These features can be immediately appreciated because of the semi-transparent nature of the muscles and the ability to see around the bones and through the various skeletal orifices from either the posterior or the anterior aspect.

An object of the present invention is to provide instructions for the reconstruction of human organ systems on a two-dimensional skeletal manikin, in the process of which mulitple overlays of organ system components are formed which enable the student to study gross anatomy in a way which has heretofore not been attempted but which should provide considerable antomical insights.

A further object of the present invention is to provide separate illustrations and descriptions of the muscles in which the entire extent of each muscle and any tendinous extensions are illustrated precisely and described adequately so that the student may use the appropriate illustration and description as a guide in positioning each muscle on its proper skeletal or muscular origin and insertion.

It is a further object of the present invention to provide appropriate glossy backing for each of the vinyl plastic components, with identifying indicia thereon, upon which the various components of each organ system may be returned after use for later re-use.

Using skeletal muscles to exemplify the process, the invention will now be more fully described with reference to the accompanying drawings in which.

Figure 2:
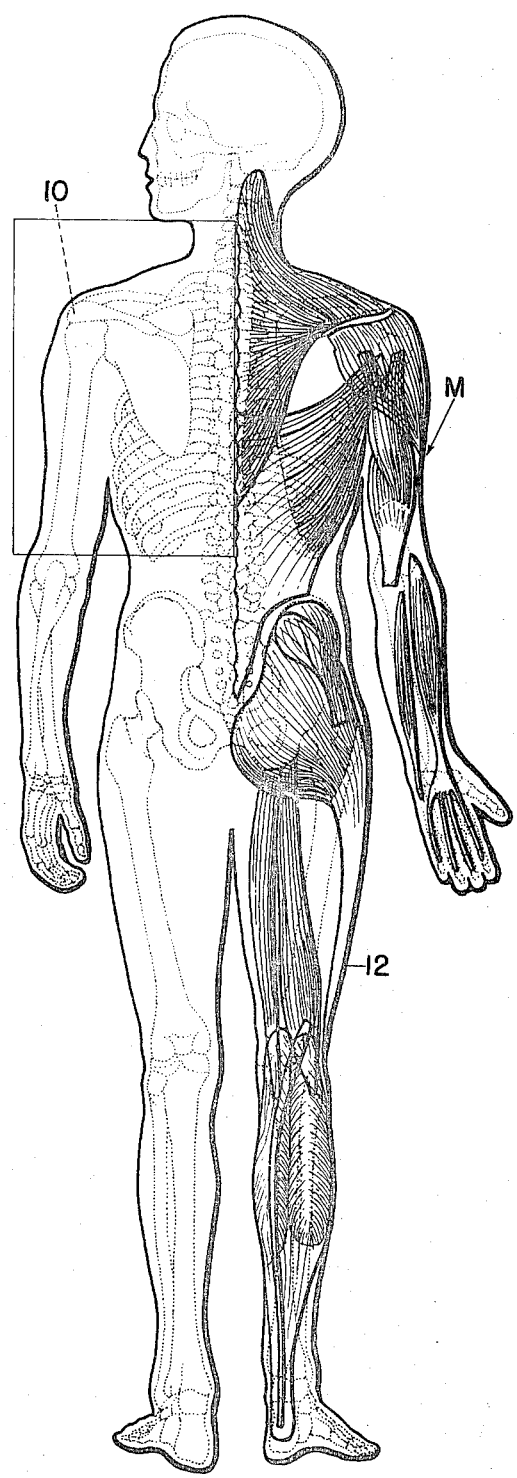
FIG. 2 is a posterior view of the same human skeleton illustrated in FIG. 1 with some of the muscles printed on transparent vinyl plastic in place and as they would appear after the student has successfully placed them on the skeleton according to their correct origins and insertions as provided in written and illustrated directions.
Figure 3:
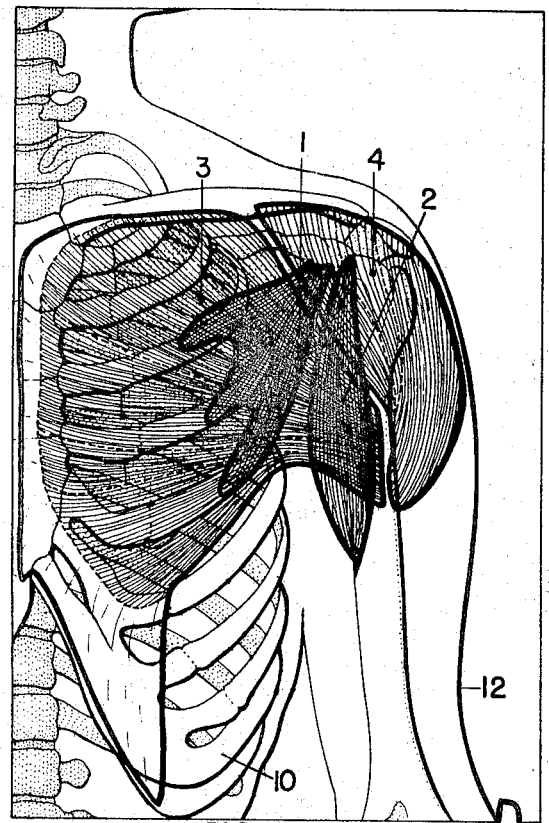
FIG. 3 is an enlargement of the section of FIG. 1 defined by the rectangle.
Figure 3A:
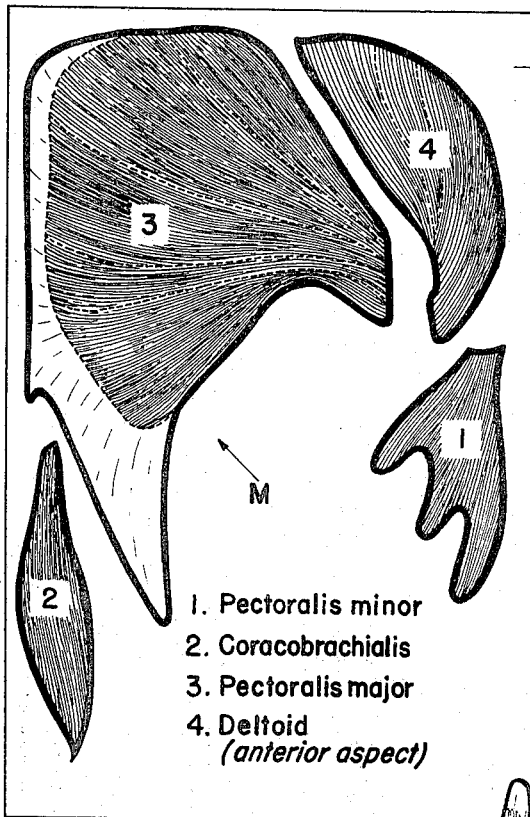
Figure 4A:
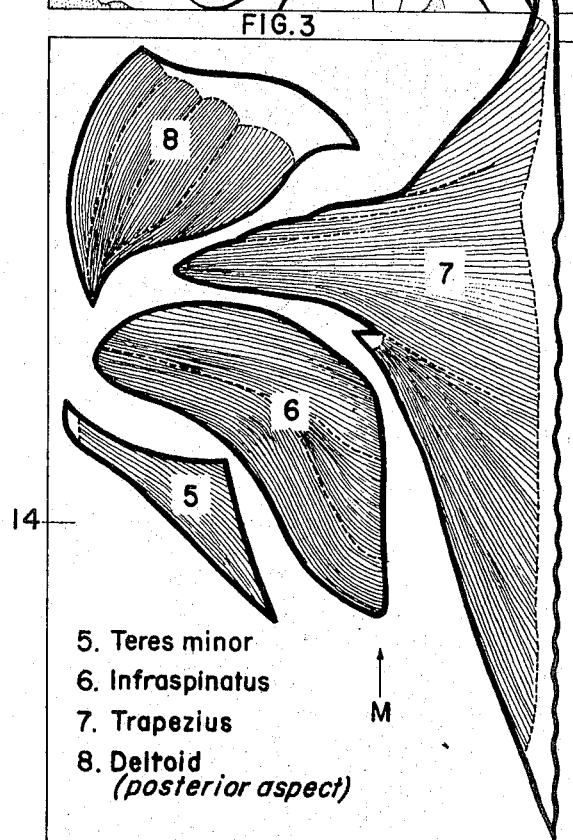
Figure 4:
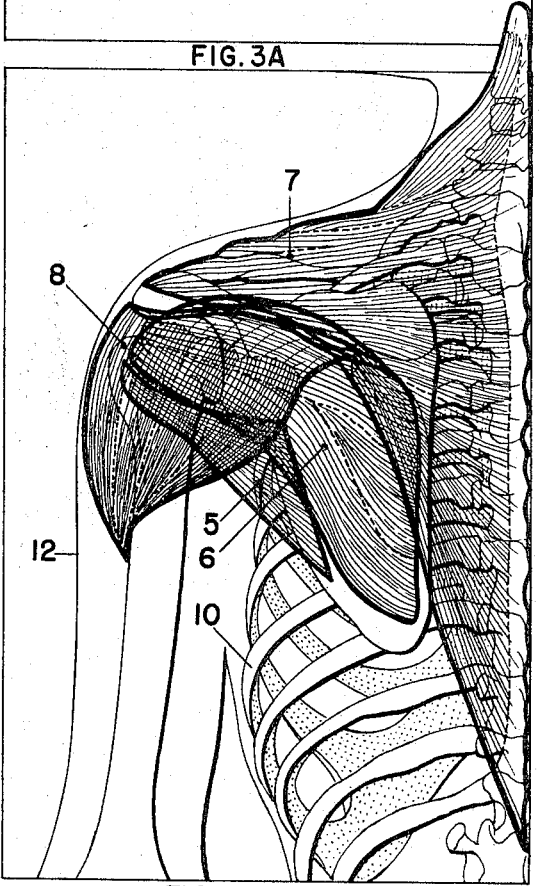

FIG. 3A shows in a separated form various muscles applied to the portion of the skeleton shown in FIG. 3. The muscles numbered 1–4 in FIG. 3 correspond to the numbered muscles in FIG. 3A. The names of the muscles are given below the separate muscles in FIG. 3A;

FIG. 4 is an enlargement of the section of FIG. 2 defined by the rectangle; and

FIG. 4A shows in a separated form various muscles applied to the portion of the skeleton shown in FIG. 4. The muscles numbered 5–8 in FIG. 4 correspond to the numbered muscles in FIG. 4A. The names of the muscles are given below the separate muscles in FIG. 4A.

DESCRIPTION OF THE PREFERRED EMBODIMENT

Figure 1:
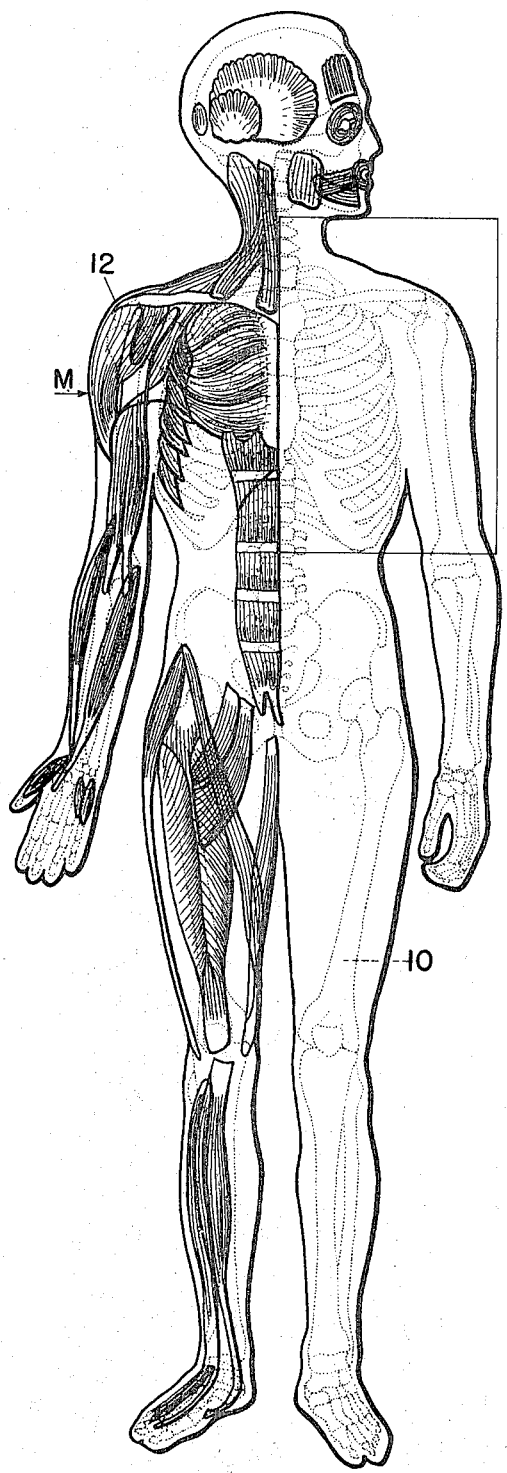
FIG. 1 is an anterior view of the human skeleton showing some of the muscles printed on transparent vinyl plastic in place and as they would appear after the student has successfully placed them on the skeleton according to their correct origins and insertions as provided in written and illustrated directions.

Referring to FIGS. 1 and 2, a human skeleton 10, the bones of which are opaque, is shown in both anterior and posterior views in a body outline 12. The posterior skeleton 10 illustrated in FIG. 2 is precisely matched back to back with the anterior skeleton 10 in FIG. 1. The regions surrounding the individual bones are transparent so that portions of the posterior musculature can be viewed from anterior aspect, and vice versa. The present instructional method and device may be employed effectively to visually establish the precise anatomical positions of each muscle identified and discussed and aids the student in the comprehension of the overlapping relationships which the muscles have to one another. The present teaching aid may also be directed, within the teachings of the present invention, to the visualization of the precise anatomical relationships among other human systems such as the integumentary, digestive, respiratory, circulatory, urinary, reproductive, nervous, and endocrine systems. The body outline 12 and the opaque anterior and posterior skeletons 10 are printed on a glossy transparent backing and the muscular system comprises a large number of individually die-cut muscles printed on transparent flat vinyl plastic segments, of which 1–8 shown in FIGS. 3A and 4A are examples. The transparent vinyl plastic on which the muscles M are printed will adhere to the manikin printed on the glossy and transparent backing when suitable pressure is applied to the surface of each muscle segment. Selected colors are employed for each of the organ systems. For example, each of the vinyl plastic muscles is colored in red and white. The bands of red color in the muscles are used to indicate the direction of the fibers. The white color in the muscles is used to indicate tendinous extensions, aponeuroses and connective tissue tracts which attach muscles to bones, muscles to muscles, or muscles to other types of connective tissue. The muscles M are placed appropriately on the manikin consisting of the skeleton 10 and body outline 12 by either grouping the muscles by layers, that is, first affixing the deep layer of muscles, then affixing the middle layer of muscles, and finally affixing the superficial layer of muscles; or by grouping the muscles functionally, that is, affixing the muscles that move the shoulder, muscles that move the elbow joint, etc. With either of these techniques, a student may position each muscle M on its proper skeletal or muscular attachment points. These systems permit the student to establish visually the precise antomical positions and attachment points of each of the muscles and promote a comprehension of the overlapping relationships which the muscles have with each other. Because the spaces between the red band of each muscle are transparent and the colors are semi-transparent, the underlying bones as well as the muscles already fixed on the skeleton 10 remain partly visible after each additional muscle is placed on the skeleton. This system permits the visualization of the origins and insertions of muscles not yet placed in position without necessitating the removal of muscles already fixed to the skeleton 10. Many muscles which are in part on the anterior aspect of the skeleton 10 may be also viewed from posterior aspect, and vice versa, because the regions around the bones and the skeletal orifices are transparent. This particular effect permits a student to visualize the physical contributions of specific muscles being studied from both anterior and posterior aspects of the body.

When all the muscles M are in place on the skeleton 10 within the body outline 12, the completed two-dimensional manikin will appear superficially similar to standard illustrations of the human musculature after removal of the skin and subcutaneous connective tissue. However, the overlapping of several layers of muscles on both anterior and posterior aspects of the manikin tends to confer a three-dimensional appearance to it.

When the student has completed the study of all functional regions, or of the deep, middle, and superficial layers, the muscles can be easily removed from the skeleton 10 by peeling and may be replaced on their respective backings 14 to be re-used at a later date for study, review, or other purposes.

It is also within the scope of the present invention to apply the foregoing principles to a drawing of a specific region of the skeleton, to facilitate the study of muscles which are small in size relative to the scale of the complete manikin.

The present instructional device may be incorporated into a laboratory manual, may be distributed as a separate laboratory kit, or may be made available in both forms. In either or both of these forms, the instructional device preferably will include the following: (a) a body outline and anterior and posterior views of an opaque skeleton printed back to back on a transparent glossy backing; (b) approximately 100 individually die-cut muscles printed with a silk screen technique on transparent vinyl plastic and mounted on suitable glossy rigid backings with indicia; and (c) an illustrated instructional guide written specifically for use with the kit described herein.

What is claimed is:

1. An instructional device for studying the gross anatomy of the human or animal organ systems and organs comprising a two-dimensional manikin having anterior and posterior views of an opaque skeleton printed back to back on a transparent glossy backing and surrounded by an appropriate body outline, and a plurality of individually cut and individually applied illustrative organs of the organ systems constituted of vinyl plastic, each of said organs having selected, semi-transparent colors and transparent areas thereon, said colors indicating certain properties of said organs, the latter being adapted to adhere to the manikin upon the application of pressure thereto after each is accurately positioned on the manikin, said semi-transparent colors and transparent areas on each organ applied to said manikin permitting the visualization of the underlying bones and all attachment points thereon by the student of anatomical study of both the anterior and posterior views of the skeleton.

2. An instructional device as claimed in claim 1 wherein the organ system is a muscular organ system of the human body and the colors are red and white bands, said red bands indicating the direction of the muscle fibers, and said white bands indicating tendinous extensions, aponeuroses, or other types of connective tissue.

* * * * *